Aug. 5, 1952     F. D. BARCLAY, JR     2,605,608
JET REACTION MOTOR
Filed June 27, 1946     5 Sheets-Sheet 1
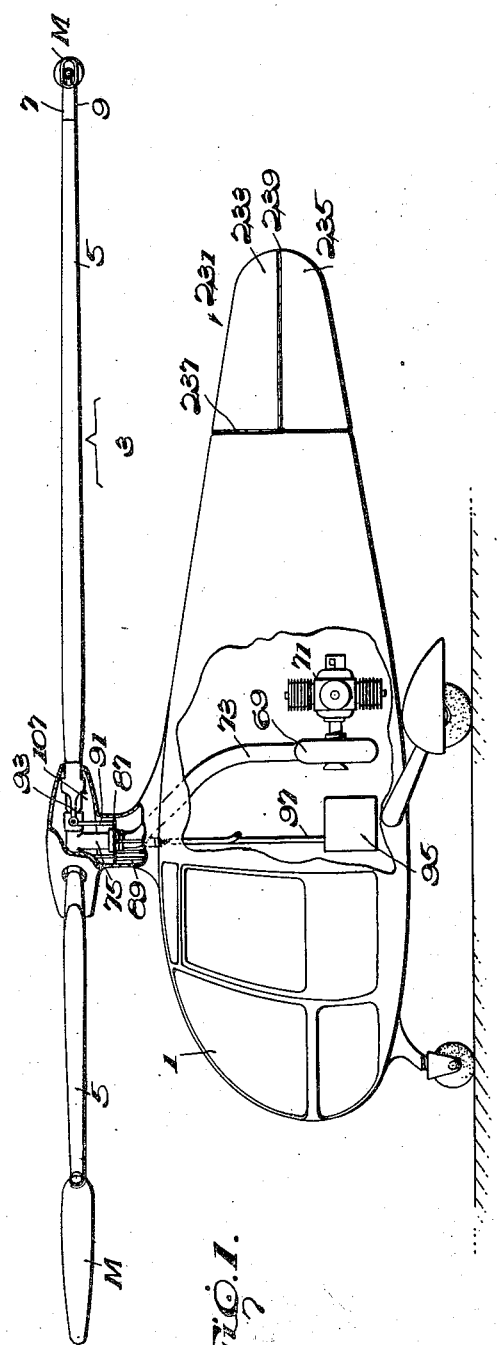
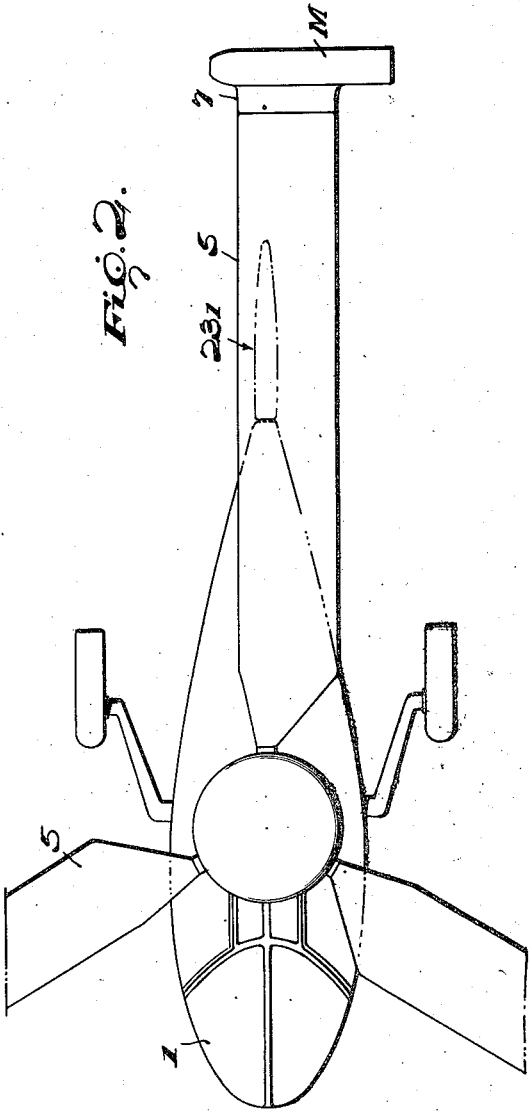
Inventor
Frank D. Barclay, Jr.
By F. J. Schmitt
Attorney

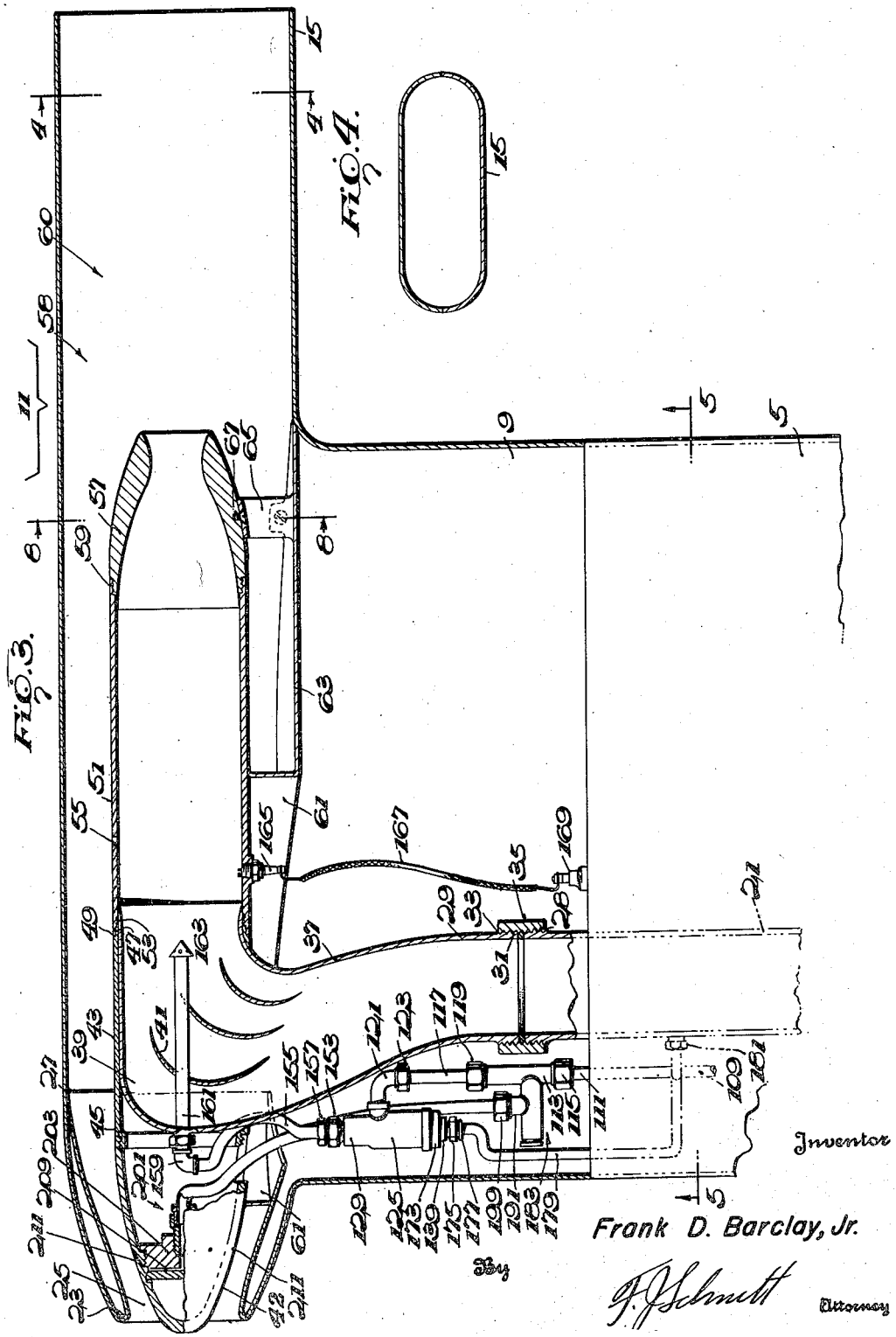

Aug. 5, 1952     F. D. BARCLAY, JR.     2,605,608
JET REACTION MOTOR
Filed June 27, 1946     5 Sheets-Sheet 3
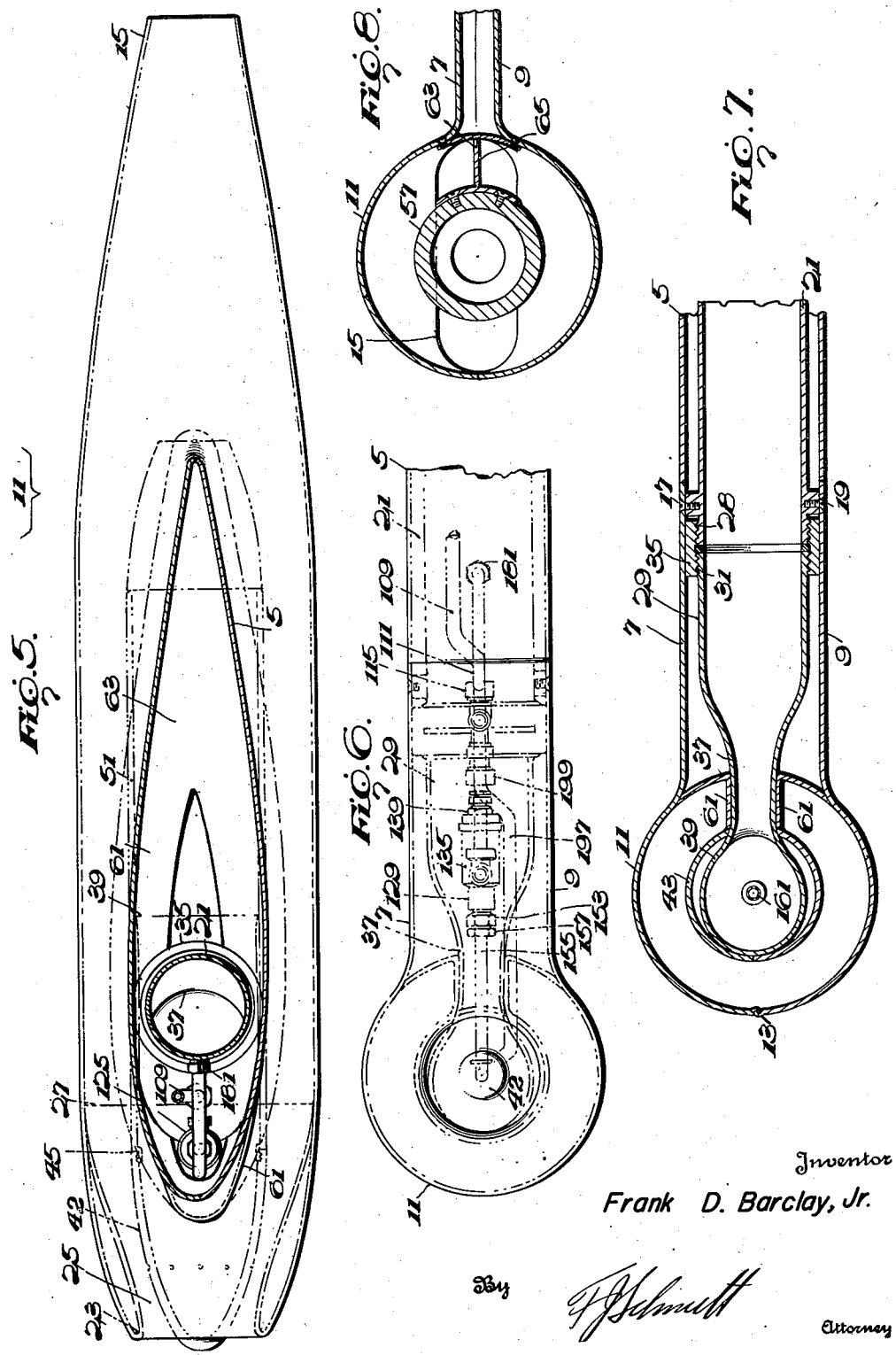
Inventor
Frank D. Barclay, Jr.
By
Attorney

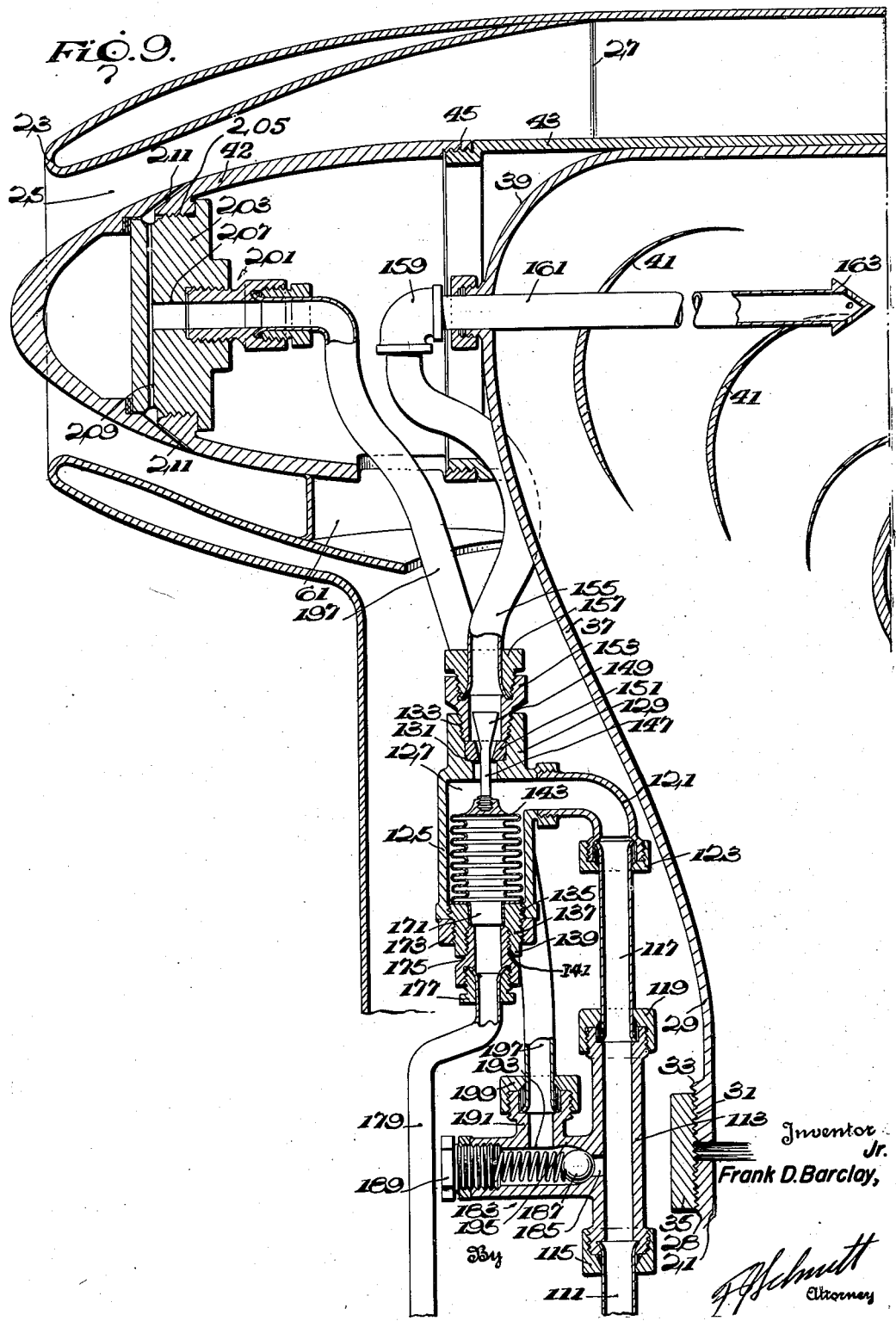

Aug. 5, 1952　　　F. D. BARCLAY, JR　　　2,605,608
JET REACTION MOTOR
Filed June 27, 1946　　　　　　　　　　　5 Sheets-Sheet 5
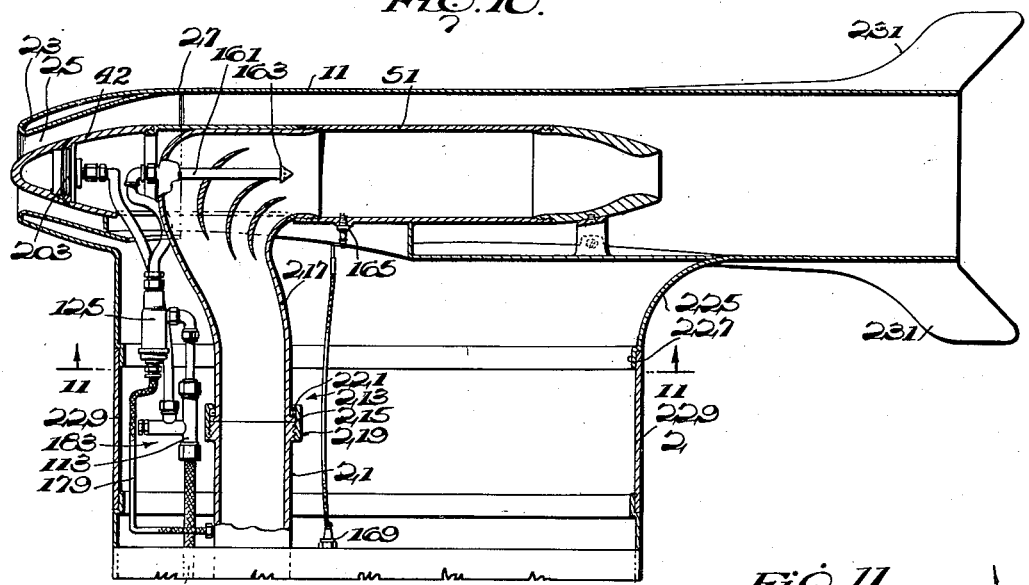
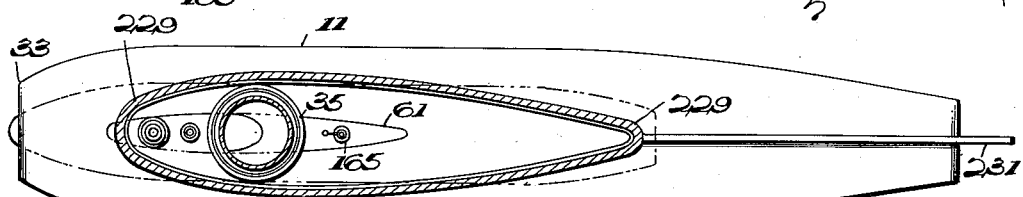
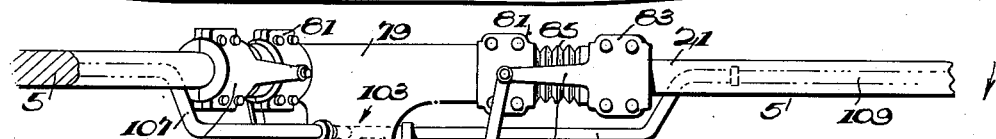
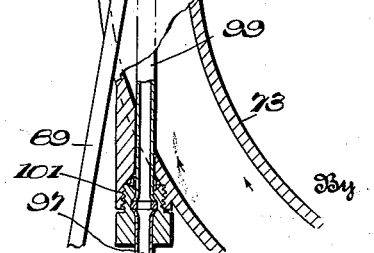
Inventor
Frank D. Barclay, Jr.

Patented Aug. 5, 1952

2,605,608

UNITED STATES PATENT OFFICE 2,605,608

JET REACTION MOTOR

Frank D. Barclay, Jr., United States Navy

Application June 27, 1946, Serial No. 679,633

5 Claims. (Cl. 60—35.6)

(Granted under the act of March 3, 1883, as amended April 30, 1928; 370 O. G. 757)

This invention relates generally to jet reaction motors or propulsion units for the propulsion of vehicles of various kinds, and in its more specific aspects it relates to jet propulsion units adapted for the production of a reaction motive force for rotating the blades of a rotary wing aircraft or the propellers of a propeller driven aircraft; and the nature and objects of the invention will be readily recognized and understood by those skilled in the arts to which it relates in the light of the following explanation and detailed description of the accompanying drawings illustrating what I at present believe to be the preferred embodiments and mechanical expressions of the invention from among various other forms, arrangements, combinations, and construction of which the invention is capable within the spirit and scope thereof.

The jet reaction unit of this invention may be utilized for the propulsion of various types of vehicles, but as one example thereof, I have illustrated and described in this application its use as a propulsion means for a rotary wing aircraft or helicopter. In this particular adaptation of the propulsion unit, I propose to mount one such jet reaction motor preferably, though not necessarily, on the tip of each blade of the rotary wing aircraft to produce rotation of the blades as a result of the thrust generated by each blade carried motor unit, to thereby propel the aircraft.

Each reaction motor unit is generally in the form of an ejector which relies for its operation and propulsive effect upon the creation of a pressure differential between the fore or leading and aft or trailing ends thereof such as to exert a forward thrust upon the element to be propelled in the instant embodiment a rotary blade. Reaction motor units of the general class with which I am concerned depend generally for their operation upon the controlled expansion within and from the motor of products of combustion, with the resulting conversion of the pressure and high temperature of the gases into a high velocity gas stream which provides the propulsive thrust of the reaction motor. In order to obtain the maximum propulsive efficiency, it is desirable that the reaction motor unit fulfill certain conditions. For instance, it is desirable to have burner pressures of a magnitude of several atmospheres and temperatures approaching the thermal limits of the burner material.

In designing a reaction motor capable of meeting such conditions without involving heavy and cumbersome equipment, I have provided means for short period cooling of the burner, for high temperature conditions without an undesirable reduction of thrust or propulsive effect through heat losses from the burner chamber, and while using only light metals or alloys for the motor elements, and it is therefore a primary object of my invention to provide a jet reaction motor which withstand high burner pressures and temperatures as a result of short period cooling of the burner chamber while producing the highest propulsive efficiency.

This short period cooling of the main burner chamber under certain operating conditions allows a lower mean temperature in the walls of the main burner chamber, thereby offsetting to a degree the weakening of the walls as a result of high temperatures, which is particularly advantageous due to the centrifugal load acting on the burner when the motor is mounted on a rotary element such as a blade of a rotary wing aircraft.

It is my intention to provide short period or intermittent cooling of the burner chamber for it is desirable in order to obtain the highest efficiency to retain as much of the heat flow as possible in the main burner chamber to make the maximum use of it in expansion therefrom.

It is a further object of my invention not to waste the heat which is transferred or conducted from the burner chamber as a result of the above outlined accelerated cooling or as a result of normal heat transfer, but to utilize such heat, in the controlled flow of gas in a secondary chamber, as high speed energy in the expansion of the gases in the secondary chamber, thereby augmenting the thrust effect of the main burner exhaust.

A further purpose of my invention is to increase the efficiency of the main burner propulsion system by utilizing the speed energy in the main burner exhaust stream by combining with it, in a particular way and under specific conditions, the gas flow from the secondary chamber, to thereby increase the total momentum change of gas flow through the ejector unit to thereby produce added thrust.

It is also an object of my invention to provide means for producing additional thrust to that produced by the main burner gas flow and the normal secondary chamber gas flow. This extra thrust may be brought into operation in take-off for either rotary wing or propeller driven aircraft when heavily loaded or for high speed operation of such types of aircraft, and of course other applications of this extra power may be made.

Another object of my invention is to use the secondary chamber for controlling and generating the gas flow which is used to provide the extra propulsive power.

A still further object of my invention is to provide a mechanism automatically operating the extra thrust or power producing means when certain aircraft operating conditions are met.

Another object of my invention is to provide a main burner chamber and a secondary burner chamber so combined that the main burner chamber may be cooled, heat losses therefrom reduced and utilized in the secondary chamber to add to the thrust of the reaction motor unit, and additional thrust imparted to the unit by adding heat to the flow of gas in the secondary chamber beyond the heat conducted thereto from the main chamber, and mixing the gases from each chamber under controlled conditions augmenting the propulsive results of the unit.

Another object of my invention is to provide means for producing a flow of compressed air to the main burner chamber and to provide a fuel feeding system in association with said compressed air feeding system, which will, upon failure of said air compressing means, automatically feed fuel to said secondary chamber for the functioning thereof to impart added thrust to the propulsion unit.

My invention further includes as an operative concept the utilization of centrifugal action on certain elements of the fuel feeding system in combination with fuel and air pressures to effect certain of the results obtained by the invention.

I propose to carry the air compressing means in the fuselage of the aircraft or some position inboard of the blades proper and to utilize the compressed air ducts within the rotary blades as load carrying members.

A further object and advantage of my invention is to provide a jet reaction motor combined with the rotary blades of a rotary wing aircraft so that no torque other than friction or air downwash or backwash is imparted to the body being lifted or propelled.

It is also an object of my invention to provide jet reaction motors which are mounted on the rotary blades of rotary wing aircraft or on the propellers or propeller driven aircraft in such manner that they may be removed therefrom with facility.

Another object of my invention is to provide for quick and simple disconnection of fuel and air lines serving a jet reaction motor for facilitating detachment of the motor unit.

A further object of my invention is to provide a light weight, highly efficient power plant for rotary wing or propeller driven aircraft, and one which is easily constructed.

It is a further purpose of my invention to provide a flow of air under pressure to the reaction motor and to provide means automatically governing and ensuring the proper fuel/air ratio to the motor.

Another object of my invention is to so mount jet reaction motors on the tips of rotary blades of rotary wing aircraft as to eliminate vertical force components from the unit which would produce undue flapping in the blades.

As it is desirable that the motor units which are mounted on the rotary blades assume such an angle that they are operating at zero degrees to the horizon when the blades are at normal operating angles, I propose in one form of my invention to so mount and construct the motor units that they will automatically stream themselves into the desired horizontal operating position.

Another object of my invention is to provide a unique tail structure on a rotary wing aircraft to provide for utilization of the downwash from the blades for controlling the direction of flight of the aircraft.

With the foregoing general objects, features and results in view, as well as certain others which will be apparent from the following explanation, the invention consists in certain novel features and designs, construction, mountings and combinations of elements, as will be more fully and particularly referred to and specified hereinafter.

Referring to the accompanying drawings:

Fig. 1 is a view in side elevation of a rotary wing aircraft provided with the propulsion units and controls therefor of this invention, parts thereof being broken away;

Fig. 2 is a top plan view of a rotary wing aircraft provided with the propulsion units of this invention, with parts thereof being broken away;

Fig. 3 is a top plan view of a propulsion unit mounted on the tip of a rotary blade, with parts thereof in section;

Fig. 4 is a view taken on line 4—4 of Fig. 3;

Fig. 5 is a view taken on line 5—5 of Fig. 3;

Fig. 6 is a view in front elevation of a propulsion unit mounted on the tip of a rotary blade, a portion of the blade being broken away;

Fig. 7 is a view in vertical section of a propulsion unit mounted on the tip of a rotary blade, a portion of the blade being broken away;

Fig. 8 is a view taken on line 8—8 of Fig. 3;

Fig. 9 is an enlarged view generally similar to Fig. 3, but with further parts thereof shown in section;

Fig. 10 is a top plan view of a modified type of propulsion unit and a modified form of mounting on the tip of a rotary blade, with parts thereof in section;

Fig. 11 is a view taken on line 11—11 of Fig. 10; and

Fig. 12 is a detail view in elevation of the hub for the rotary blades the supporting column, and the arrangement of associating the stationary fuel and air lines with rotating parts.

Referring to the accompanying drawings wherein I have illustrated as an example of one adaptation of my jet reaction motor to a rotary wing aircraft or helicopter which includes a fuselage or body 1 upon which is mounted an airfoil, blade or wing assembly 3 for rotation thereabove in a horizontal plane. The assembly 3 comprises a set of airfoils, blades or wings 5, each of which is of suitable form to develop a vertical lift when rotated as in the usual rotary wing aircraft or helicopter.

In the drawings, I have illustrated jet reaction motors M of this invention applied to a rotary wing aircraft to provide the propulsive means therefor, and I have shown such motors mounted on the tip of each rotary blade 5 chordwise thereof; however, it is to be understood that the jet reaction motors may be utilized to rotate the propellers of a propeller driven aircraft, or may be mounted along the span of the rotary blades of a rotary wing aircraft.

As one embodiment of the propulsion unit M and the attachment thereof on the tip of a blade for simple and rapid detachment therefrom in its entirety, or for removal of parts thereof for replacement, inspection and the like, I provide top and bottom skin members 7 and 9, respectively, forming in effect an extension of the airfoil section or blade 5. The outer sections of each of the skins 7 and 9 are of expanded cross-section, and are longitudinally elongated and of such configuration to provide a generally streamlined casing or secondary chamber and augmenter tube which I shall designate generally by the numeral 11, such casing formed by the outer sections of the skin members being of greater chordwise length than the chord of the airfoil, through not necessarily, and of generally cylindrical cross-section the major portion of the length thereof. The outer ends of the two complementary casing-forming outer skin sections may be removably fastened together at the abutting edges 13 in any convenient manner, and the inner ends of skin members 7 and 9 are secured to a load supporting duct 21, which extends through each of the blades 5, by means of screws 17 and 19 which are threaded into the walls of the duct. The casing or augmenter tube is open at both the leading and trailing ends thereof to provide a through airflow passage or tube producing a relatively low aerodynamic drag. The casing 11 is pinched or otherwise formed into a flattened hollow annular shape instead of cylindrical to form a horizontally elongated exit nozzle 15, as particularly illustrated in Fig. 4 of the drawings. The taper or shaping of the casing being particularly illustrated in Figs. 5 and 11 of the drawings. The purpose of this shaping of the exit nozzle will hereinafter be described. The casing 11 forms what I shall term a secondary reactive unit.

The leading edge of each outer expanded section of skin members 7 and 9 is rearwardly bent inwardly relative to the casing as at 23 to extend a distance thereinto, and is so positioned relative to the casing that the leading or air inlet end thereof is of reduced cross-section as at 25, relative to the remainder of the casing. The rearwardly bent portions are welded or otherwise secured at the rear ends thereof, to the casing as at 27, and the cross-sectional area of the space defined by the rearwardly bent portions expands rearwardly between the bends 23 and the rear ends 27 of the rearwardly bent portions.

The duct 21 which extends from the inboard end of each blade 5 outwardly to the end of the main blade body constitutes a load carrying spar in the particular embodiment of the form of the invention disclosed in this application, and supports a substantial portion of a propulsion unit. Duct 21 which is disposed in each blade is provided for conducting air under forced draft to a blade tip mounted propulsion unit and preferably extends a distance beyond the outboard end of the blade 5, and at its end the duct is externally threaded as at 28. A complementary duct length 29, adapted to form an extension of duct 21, is provided with an externally threaded inboard end 31, provided with a shoulder or the like 33, which extension is adapted, when in normal operating assembled position to be releasably locked to outboard end of the duct 21, by means of a disconnect fitting including a locking sleeve or the like 35, so as to provide a continuation of the compressed air duct 21. It will be apparent that any other convenient and desirable duct joining means may be employed in joining the two duct sections together, and it will further be apparent that by the particular arrangement illustrated, the duct length 29 may be released from the duct 21 by merely unscrewing the locking sleeve or ring 35. The duct 29 is provided with a throat portion 37, adjacent the outer end thereof where the duct extends into the casing or augmenter tube 11. Such throat portion of the duct provides a forced air conduit of reduced vertical thickness, but of broadened horizontal dimensions, as clearly illustrated in Fig. 7 of the drawings. The outer end of the compressed air duct extension 29 is formed to provide a rearwardly directed compressed air exhaust member 39, which is disposed when in jointed position relative to the duct 21 in position within the augmenter tube to exhaust air rearwardly therefrom. I preferably provide a series of baffles 41, which extend slightly into the throat of the duct section, and are formed to direct the flow of compressed air rearwardly at an angle to the flow of air within the duct without producing any adverse and undesirable currents in the stream of air.

The compressed air exhaust member 39 forms a part of the primary reactive unit of each complete propulsion unit, and is incorporated in such primary reactive unit in the following manner. A spinner 42, which I shall describe in detail hereinafter, is threadedly attached to the leading end of a cylindrical central section 43 of the primary reactive unit as at 45, the central section 43 being formed in halves as particularly disclosed in Fig. 7 of the drawings. The inner half of central section has an opening therein for receiving therethrough the throat of the duct. The two parts of central section 43 are held and locked in assembled operative position relative to the other elements of the primary reactive unit and about compressed air exhaust member 39, by means of flanges 47 which are provided on the rear or aft ends of the halves of central section and which are locked between a lip 49 of primary burner chamber 51 and the aft end of the compressed air exhaust member, such member and the primary burner chamber being threadedly joined as at 53.

The primary burner chamber 51 is a cylindrical member and is preferably, though not necessarily, provided with a perforation 55 in the wall thereof for a purpose to be hereinafter described. The primary exhaust nozzle 57 is threaded to the aft end of the primary burner chamber 51 as at 59.

Thus it will be recognized that the primary reactive unit of each jet propulsion unit comprises the spinner or head 41, the central section 43 embracing compressed air member 39, the primary burner chamber 51 and exhaust nozzle 57, these elements in operative assembled position providing a longitudinally elongated and streamlined primary reactive unit which is closed at its forward or leading end but open at the aft or trailing end.

Referring particularly to Fig. 3 of the drawings, it will be evident that the secondary reactive unit, comprised in general by the casing 11, longitudinally encloses the primary reactive unit and has the longitudinal axis thereof coincident with the longitudinal axis of the primary reactive unit, the walls of the elements forming the primary reactive unit being spaced from the walls of casing 11 to provide an airflow passage therethrough of varying cross-section. It will be clear from reference to the drawings that the aft or trailing end of the primary reactive unit formed by the nozzle 57 is forwardly spaced a substantial distance from the end 15 of casing 11.

In order to close the area between skins 7 and 9 against the ingress of air from the secondary reactive unit or casing 11, and to provide a fairing for the throat of duct extension 29, I insert a fillet or the like 61 which extends between the primary reactive unit and the rearwardly bent portion of the leading edge of the casing 11 and extends around the top and bottom of the throat in contact with skins 7 and 9 to extend rearwardly as at 63 in a plate-like extension having a nozzle strengthening leg 65 which is secured to the nozzle 57 by means of a screw or the like 67, all as particularly illustrated in Figs. 3, 5, 7 and 8 of the drawings. This nozzle strengthening leg will hold the nozzle in position on the primary burner chamber against centrifugal forces when the blade is rotating.

It will be apparent from the drawings and the description of the invention to this point that the duct 21 rigidly supports the propulsion unit through the medium of the extension duct 29 and skins 7 and 9.

Since the propulsion unit is attached to the tip of a rotary blade by a rigid connection, it is advisable to shape the casing 11 with regard to distance fore and aft of the blade center of rotation in such a way that the unit would be neutrally stable. Namely, it would have zero moment about the blade rotation axis, regardless of its angle of attack with regard to the relative wind or outside airstream.

As weight is an important factor in the efficient operation of the propulsion units, I propose to construct the units out of sheet metal or light metal alloy castings.

As hereinbefore stated, I supply a stream of compressed air to the primary reactive unit, compression being necessary to provide efficient utilization of the heat supplied at the burner which will be more fully explained hereinafter. I provide a blower or air compressor 69 operated by a piston engine 71 which is controlled by the pilot of the aircraft. The compressor and engine are mounted in the cabin or fuselage 1 of the rotary wing aircraft or helicopter. The blower engine can be mounted vertically in order to eliminate torque or turning of the helicopter body in the horizontal plane and the engine torque may be compensated for by center of gravity location or the pendular action of the helicopter body.

Compressed air is conducted from the compressor 69 by means of a conduit 73 which extends upwardly through the cabin of the aircraft to the main hollow hub or column 75 which is rotatably supported in any suitable and customary manner on the cabin or fuselage of the aircraft. (See Fig. 12 of the drawings.) The stationary air conduit 73 is attached to the rotatable column 75 for the flow of air from the former to the latter by means of a thrust bearing and rotary air seal 77, or in any other convenient and suitable manner. The compressed air flows from stationary conduit 73 into and through hollow rotatable column 75 into a manifold or the like 79 at the top of the column from which it flows into each of ducts 21 in blades 5 through thrust bearings 81 and blade retention clamp 83 connected by means of flexible tubings 85 for the flow of air therebetween.

In Fig. 12 of the drawings, I have illustrated a conventional type of cyclic pitch change mechanism for the blades 5 which includes a swash plate 87, cockpit control rods 89, pitch change rods 91, links 93 and the thrust bearings. As this mechanism forms no part of the instant invention and is well known in the art, I shall not describe it in further detail.

I have devised a novel system of feeding and regulating the flow of fuel to the combustion chambers which, in certain of the functions thereof is automatic following aircraft pilot initiated operations, and which system automatically produces the proper fuel-air ratio and which automatically brings the secondary reactive unit into its peak thrust producing operation when certain aircraft operating conditions prevail.

Such fuel feed and control system is initially set in operation by the pilot of the aircraft, controls therefor of course being located in the fuselage. A fuel tank 95 is carried in the fuselage at any position therein which is suitable and in accordance with aerodynamic requirements, and a main stationary or fixed fuel line 97 carries fuel from the tank upwardly through the fuselage. Referring particularly to Fig. 12 of the drawings, it will be apparent that the stationary fuel line 97 is jointed to a rotary fuel line 99 which extends from outside the compressed air conduit 73 upwardly therein and into the rotary column 75. The stationary and rotary fuel lines 97 and 99 are coupled together outside the air conduit and therebelow by means of a rotary seal or like joint 101. It is desirable to join the fixed and rotary fuel feed sections together at a point below the air conduit so that there will be no danger of fuel leaking from the rotary seal into the stream of air flowing into the primary reactive unit, and it may be desirable to associate a leakage catch tube with the rotary seal to return any fuel which may have leaked to the tank.

The outboard end of the rotary fuel feed line is provided with any suitable manifold arrangement 103 providing radially extending arms 105 extending through column 75, there being of course one of such arms for each blade 5 of the blade assembly. Flexible fuel leads 107 are attached to each arm 105 of the manifold and extend into the blades 5 for attachment to the fuel lines 109 which extend through the blades, the fuel feed lines 109 extending a distance beyond the major blade 5 as at 111. It will thus be evident that fuel is pumped from the fuselage to and beyond the blade ends where, as I am about to describe, the fuel feed controlling mechanism is hooked into the fuel feed line 109 at the end of the extension 111.

Fuel is preferably, though not necessarily, pumped through the system by means of an electric fuel pump which is run off a generator circuit when engine 71 is operating, but will function on current supplied from batteries in the event of engine failure, and of course, the operation of the fuel pump may be controlled by the aircraft pilot.

Removably attached to the outboard end of fuel feed extension 111 is a fitting 113 which is maintained in fuel receiving position relative to extension 111 by means of a coupling nut 115 which releasably locks the flared ends of extension 111 and fitting 113 together. Similar means are provided for releasably maintaining a section of tubing 117 in fuel receiving association relative to the outboard end of fitting 113, a further nut 119 being employed for this purpose. An elbow 121 is releasably secured on the end of tube 117 by means of a nut 123, the elbow directing the main fuel flow into a bellows fitting 125 providing a bellows chamber 127, the elbow being threadedly attached to the fitting 125. The fitting 125 is provided at the outboard end thereof with an outwardly extending sleeve designated generally by the numeral 129, which sleeve is interiorly stepped to provide an inboard valve seat receiving socket 131 and an outboard interiorly threaded socket 133 of greater diameter than the inboard socket. The opposite or inboard end of fitting 125 is interiorly threaded as at 135 for threadedly receiving a bellows supporting member 137 having a portion 139 extending free of the inboard end of bellows fitting, the portion 139 being interiorly threaded as at 141.

A valve controlling bellows 143 is mounted in the chamber 127 of bellows fitting, the bellows has spring action since it is made of metal and resists expansion. A spring may be incorporated with the bellows as an auxiliary, if necessary, to maintain the bellows under collapsing tension. The bellows mounts at the outboard end thereof a valve stem 147 carrying a preferably substantially conical valve 149 on the end thereof for reciprocation, under the influence of the bellows and under certain other influences as will hereinafter be specified, within the sockets in sleeve 129 for seating on a valve seat 151 provided in the inboard socket 131, such seat being formed in halves for facilitating assembly and disassembly of the apparatus. A fitting 153 is threadedly attached to the outboard socket 133 for receiving therein the inboard free end of a tubing section, 155, for fuel flow, such fuel tube being releasably locked to the fitting 153 by means of a nut 157.

The section of fuel feed line 155 extends outwardly and is attached to an elbow 159 the other end of which is attached to the fore end of a fuel nozzle tube 161 which projects through the forward end of compressed air exhaust member 39 on the longitudinal axis of the primary reactive unit. The fuel nozzle tube extends in a straight line rearwardly and is provided with a fuel nozzle 163 of any suitable type for exhausting the fuel into the flow of air discharging from the rear end of compressed air exhaust member 39. The fuel nozzle tube may extend through certain of baffles 41 which will provide added support for the nozzle tube.

It will now be recognized that the main or primary fuel feed line from tank 95, comprises lines 97 and 99, arms 105, fuel leads 107, blade carried lines 109, extension 111, fitting 113, tube section 117, elbow 121, bellows fitting 125, through collar 129, section 155, elbow 159, nozzle tube 161 and exhausts from nozzle 163 into the stream of compressed air, combustion taking place in combustion chamber 51 wherein a spark plug or other igniting means 165 is mounted and is in a customary electric circuit of an aircraft including wire 167 and a terminal 169 mounted on the outboard end of blade 5.

It will be recognized that fuel enters bellows chamber 125 on one side (outboard) of the bellows for exerting pressure thereon, and I provide means for exposing the opposite (inboard) of the bellows to the influence of the stream of compressed air. The inboard compressed air end of bellows 143 is provided with a collar or member 171 thereon which is fixedly disposed in bellows supporting member 137, whereby compressed air may act on the bellows to expand the same and thereby open the valve. By adjusting member 137 within the fitting 125, it will be evident that the position of the valve 149 may be adjusted. The bellows expands and contracts away from its base in 137 depending upon the air pressure, thereby regulating the valve opening. A lock nut 173 is provided for locking supporting member 137 in position.

The free extending interiorly threaded portion 139 of bellows supporting member 137 threadedly receives a coupling member 175 which is threaded to receive a nut 177 on the end of compressed air pressure line 179 for coupling line 179 into the inboard end of bellows fitting. The compressed air pressure line 179 extends inwardly and is tapped into the compressed air duct 21 as at 181, so that air pressure from duct 21 will be communicated to the inboard end of the bellows, and act thereon as above outlined.

The elements comprising the compressed air and fuel feeding system for the primary reactive unit have been described, and I shall now describe the fuel feeding system for the secondary reactive system which automatically functions when certain aircraft operating conditions are encountered as will be explained hereinafter.

The fitting 113 forming part of the main fuel feeding system also forms a part of the secondary fuel feeding system and is formed with a lateral extension designated in its entirety by the reference numeral 183, which provides a fuel passage 185 opening into the main fuel line of the fitting 113. This fuel passage 185 is closed under certain operating conditions by means of a spring operated ball valve 187, the end of the lateral extension being closed by a cap screw 189 against which the spring bears and by means of which the tension of the spring may be adjusted. It will be apparent that upon the building up of sufficient fuel pressure in the main fuel line, the ball valve will overcome the spring pressure and open the port to permit fuel to flow into the lateral extension, and into an arm 191 extending from the outboard side of lateral extension 183.

The secondary reactive unit includes a fuel line 197 which is coupled into arm 191 by means of a lock nut 199, fuel feed line 197 extending outwardly between skins 7 and 9 and into the interior of spinner 41, where by means of a fitting and coupling or lock nut assembly 201, it is threadedly received centrally in the aft end of a plug 203 which is threadedly engaged within the spinner as at 205. The plug 203 is provided with a fuel passage 207 aligned with the fuel passage in the fitting 201, and is drilled or otherwise formed with radiating fuel passages 209 which meet or are complementary to rearwardly inclined fuel passages 211 formed through the wall of the spinner. These passages or ducts 211 form in effect an annular ring of secondary fuel nozzles directing fuel into the area between the primary reactive unit and the casing 11.

It is to be understood that I do not intend to limit the scope of this invention to include only the particular types of fuel line couplings and fittings illustrated in the drawings, for it is clearly my intention to use any customary types of couplings so long as the intended functioning and operation of the fuel and air feeding and regulating system is not interfered with.

The fuel and air feeding system operates in the following manner: The pilot of the aircraft at the start regulates the fuel pump to keep the fuel pressure to a minimum, but regulates the blower or compressor to boost the air pressure to full value. It is to be noted that further air compression, especially when full blade R. P. M. is reached, is supplied by the centrifugal force acting on the air as it passes through the blade. In starting there is little or no centrifugal force acting on valve 149 and since the fuel pressure acting on outboard end of bellows is less than the air pressure acting on the inboard end of bellows, the valve is kept open and permits feeding of fuel to the combustion chamber of the primary reactive motor. The fuel pressure acts on outboard end of bellows to close the valve and the compressed air provides an opposing force by acting on the opposite or inboard end of bellows to open the valve, the compressed air being conducted to bellows by means of tap 181 and conduit 179, and the air pressure at the bellows equals the static pressure developed in duct 21. With the conditions above outlined existent, that is up to full blade R. P. M. with the fuel pressure at a minimum while air pressures are at full value the fuel may possibly be fed by centrifugal pressure only. As the full R. P. M. is reached or substantially approached and the pilot operates the throttle to increase the fuel pressures, the centrifugal force acting on valve 149 and the compressed air pressure are great enough to overcome the increased valve closing pressure on the bellows and keep the valve open. It will be recognized that any variation in fuel and/or air pressures will produce a response in bellows to thereby further open or further close valve 149 and hence a proper fuel-air ratio will always be maintained.

At the full blade R. P. M. is reached, the hand throttle is opened to the maximum normal or the necessary normal fuel pressure for take-off at normal gross weights. Now, in the event that added pay load is on board the aircraft, the throttle may be opened further to increase fuel pressure in the fuel feed line, and this excess fuel pressure opens ball valve 187 permitting fuel to be fed through the secondary fuel feed line to the secondary reactive unit, all as will be described hereinafter. After ascent has been accomplished and normal flight attained, the fuel pressure will be reduced by the pilot, the ball valve 187 will close under action of the spring, combustion in the secondary reactive unit will cease, allowing flight on primary reactive unit with the accompanying thermodynamic and propulsive advantages from the secondary reactive unit which will be hereinafter explained.

In landing the aircraft, the above outlined operation is merely done in reverse, unless vertical descent with overload is desired, in which event, combustion in the secondary reactive unit may again be effected.

If a loss of compressed airflow resulted due to some failure in engine blower combination, the force of bellows spring 145 against which centrifugal force on valve 149 has been acting and such centrifugal force is reduced with collapse or recession of bellows to a point where all pressures in the system are still in equilibrium and valve 149 remains only partially open, thus reducing fuel flow to meet reduced airflow. Now the partial closing of valve 149 supplies the momentary (fuel pressure registered at any given speed and power) pressure to ball valve 187 and above a certain minimum speed will open the ball valve to thereby supply fuel to the secondary reactive unit for the additional propulsive thrust imparted thereby.

Referring particularly to Fig. 3 of the drawings wherein the propulsive unit is illustrated in detail, it will be seen that fuel is supplied by the nozzle 163 to the compressed airstream, and this fuel-air mixture is ignited by the spark system in the primary burner chamber 51. The products of combustion of the primary burner chamber now expand through the primary exhaust nozzle 57 with the resulting conversion of the pressure and high temperature of the gases into high velocity. This high velocity gas stream provides the main thrust output of my propulsion unit. The higher the blade tip or exhaust nozzle speed, the more efficient will be the conversion of this thrust into power, thus the attainment of high propulsive efficiencies by placing the propulsion unit at the tip of a rotating blade. As I have stated, the propulsion unit may not of necessity be placed at the blade tip, depending upon compressibility or shock wave limitations.

In order to further increase the efficiency of the primary reactive unit, I have combined the secondary reactive unit therewith by disposing the casing therearound.

The casing 11 provides a through air passage around the primary reactive unit, and this provides for short period cooling for high temperature conditions in the burner chamber 51. Continuous cooling is not necessarily intended for it is desirable to maintain the heat in the primary burner if possible to make the maximum use of it in the expansion through the burner exhaust nozzle.

By the particular combination of the primary reactive unit and the secondary unit exemplified in general by the casing 11, I utilize what heat is conducted through the walls of primary burner 51 by adding it to the secondary air, that is the air flowing through the casing 11. This secondary air to which the heat is added has been imparted a static rise and velocity loss due to the expanding cross-section as at 25 of the casing 11. This heat which would otherwise be wasted is then utilized as high speed energy in the expansion of the secondary gases, such expansion occurring through the section 58 adjacent to the primary exhaust nozzle 57.

To provide more efficient utilization of this speed energy in the main nozzle exhaust stream by adding to the total air mass discharged through the final nozzle, the secondary and main gas flows are combined in the mixing chamber 60 behind the primary exhaust nozzle. By virtue of properly controlled mixing and expansion of this main secondary airflow in the common mixing chamber, the speed energy of this primary exhaust stream may be so distributed through this combined air mass that the total momentum change or thrust is greater than the momentum change of the two exhaust streams if exhausted separately.

A secondary function of the mixing chamber is the burning therein before the final nozzle 15 of any fuel particles which have not ignited in the main burner.

When added thrust is required, fuel is supplied to the secondary reactive unit through the annular series of outlets or nozzles 211. The temperature of the walls of primary burner chamber 51 will be sufficient to ignite the fuel fed to the secondary reactive unit; however, the opening or perforation 55 in the burner chamber wall will insure fuel ignition. If desired an electric spark system could be employed in the secondary reactive unit. The fuel fed through the nozzles 211 into the secondary unit burns the secondary air at the aforementioned static pressure rise and supplies a high velocity increment to that of the primary burner.

This secondary burner will not normally be as efficient a propulsion device as the main burner since its static pressure (and therefore output for the same temperature) is limited by the velocity of the entering (or free stream) air. However, its specific output in terms of its weight is very high, and at very high speeds such as those faster than that of sound, it may become more efficient than the main burner section due to the high velocity energy of the free stream air available for pressure conversion.

The fact that the augmentation effect and power output of the secondary chamber will vary with its azimuth position in forward flight due to changing relative wind velocity is not detrimental, since it increases when the drag of the rotor blade increases and vice versa, with the increasing or decreasing relative wind, viz., on the advancing or receding part of the blade revolution. Thus, the whipping tendency of a conventional rotor where the driving power is constant, but the rotor drag varies is reduced. Also, due to the power or thrust being applied at the end of the blade which is pinned at the inboard end, the blade deflection for the same strength blade is reduced as against the conventional drive unless lag hinges are used. Lag hinges are a troublesome complication and unnecessary with this propulsion unit. Blade deflection in the horizontal plane causes a displacement of the center of pressure or resultant blade lift force with respect to the blade center of rotation and, therefore, causes control force variations. These are not desirable.

By forming the final exit or exhaust nozzle 15 of annular and not circular shape as illustrated in Fig. 4 of the drawings, I provide greater augmentation by providing more shear area for the same cross-sectional area between the merging airstreams. The nozzle 57 may also be of non-circular shape at its end for the same purpose.

The propulsion units or parts thereof are easily accessible for inspection, repair or replacement. By removing the upper skin 7, the parts are all visible and accessible, and the apparatus may be disassembled by disconnecting ducts 21 and 29 at disconnect fitting 35, and spark plug 165 may be removed. The inboard couplings of fittings 125 and 183 should be disconnected, the valve seat 151 being in halves may be removed after line 155 is released and the coupling elements therefor removed. The bellows and valve 149 may be removed through the inboard end of bellows fitting 125 after air line coupling elements are removed. Central section 43 of primary reactive unit being in halves may be released when spinner 42 and burner chamber 51 are unscrewed therefrom and, of course, nozzle 57 may be unscrewed from the primary burner chamber.

The skins 7 and 9 and the primary reactive unit in one form of my invention have been described as rigidly carried on the tip of the blade, while in Figs. 10 and 11 of the drawings I disclose an adjustably mounted arrangement. In the drawings illustrating this modified form of my invention, I have used the same reference numerals to designate similar parts.

The propulsion unit of this form of my invention is mounted on the blade tip so that the angle of attack may be automatically varied, and to accomplish this, I provide on the outboard end of duct 21, a thrust bearing which is designated in its entirety by the numeral 213, which combines in one element the disconnect member of the form of my invention illustrated in Figs. 1 through 9 of the drawings, and an air seal for the compressed air duct. The inboard end of the remaining outboard portion 217 of compressed air duct is provided with a flange 215 which is removably locked against the end of duct 21 by means of a flanged lock nut or ring 219, there being ball bearings 221 between the flange of the lock nut and the flange of duct 217. The upper and lower skins or coverings are in two sections 223 and 225, each of which is secured to the duct, the outer skin forming, as in the preferred form of my invention, the secondary reactive unit. The adjacent edges of the skins are in spaced relation and are inwardly bent as at 227 to provide a seat for a flexible material 229 which is flush with the skin exteriors to provide a smooth surface therewith and to permit pivoting of the unit on thrust bearing 213. The flexible material 229 forms an elastic fairing strip. As will be evident from Fig. 10 of the drawings, flexible fuel lines are employed where necessary. Fins 231 are provided on the trailing end of the casing 11.

With the propulsion unit mounted in accordance with this modified arrangement, the unit may then be streamed into the horizontal position by the use of the fins. In the preferred form of my invention, the unit may be set on the blade at such an angle that it is operating at zero degrees to the horizon when the blade is at the normal operating angle. This will help eliminate vertical force components from the unit which will cause undue flapping in the blades. If for any reason such mounting is unsatisfactory, then that shown in Figs. 10 and 11 of the drawings may be used.

The elastic fairing strip may taper from blade proper into a very thin airfoil section covering the valve section or inboard end of the propulsion unit proper. The purpose involved is; the tip travels at a high speed, and a thin section is necessary to eliminate high drag associated with compressibility or shock waves encountered at high speed. The per cent thickness is a major parameter in reducing drag at high speed, thus a low percentage thickness may be realized by the fairing.

Depending upon the design tip speed of the blade proper, it is possible that the propulsion unit may be at a considerable distance from the end of the blade proper to ensure high speed and efficiency for the propulsion unit. In this event the elastic fairing may fair into a section of the propulsion unit that is both thinner than the blade proper and of a small per cent thickness, the valves being under the fairing where there is sufficient room.

Referring particularly to Fig. 1 of the drawings wherein the tail of the helicopter is designated generally by the reference 231, it will be evident that I have formed this tail with two surfaces or members 233 and 235, the surface 233 being hinged along its vertical edge to the fuselage 1 as at 237, and the two surfaces being hinged together for relative movement as at 239.

To rotate the helicopter around the axis V—V, the tail surface 235 is moved relative to the surface 233, to thereby form a cambered surface which supplies a side force due to the downward direction of the component of the rotor wash. It of course will be evident that the surfaces 233 and 235 may be used as a single surface to supply directional control when there is a horizontal wind component.

The invention described herein may be manufactured and used by or for the Government of the United States of America for governmental purposes without the payment of any royalties thereon or therefor.

What I claim is:

1. Apparatus for producing a jet reactive thrust for the propulsion of vehicles, including concentrically arranged primary and secondary reactive units the primary reaction unit being inside the secondary reaction unit, the primary reactive unit operative by internal combustion therein for normal propulsion of the vehicle, and the secondary reactive unit automatically operable by additional internal combustion annularly of said primary reaction unit when the fuel pressure for the primary unit is above a predetermined pressure to thereby add propulsive thrust to the propulsive thrust developed by said primary reactive unit, said secondary reactive unit being open at both ends and said primary reactive unit having a compressed air supply conduit passing through the side of said apparatus and adapted for connection to a support for said apparatus including a source of compressed air.

2. Apparatus for producing a jet reactive thrust for the propulsion of vehicles, comprising a primary reactive unit including a combustion chamber and a fuel feed system therefor, a concentric secondary reactive unit provided with an annular combustion chamber around said primary reactive unit, said primary reactive unit operative for the normal propulsion of the vehicle, and said secondary reactive unit operative when the vehicle is subjected to abnormal loads and high speeds, and means, automatically responsive to increased fuel pressures in said primary reactive unit fuel feed system, operative to feed fuel to the combustion chamber of said secondary reactive unit to thereby add propulsive thrust to the propulsive thrust developed by said primary reactive unit, said secondary reactive unit being open at both ends and said primary reactive unit having a compressed air supply conduit passing through the side of said apparatus and adapted for connection to a support for said apparatus including a source of compressed air.

3. Apparatus for producing a jet reactive thrust for the propulsion of vehicles, comprising a primary reactive unit including a combustion chamber and a concentric secondary reactive unit provided with an annular combustion chamber around said primary reactive unit, and operator controlled means for feeding fuel to the combustion chamber of said primary reactive unit, and automatic means responsive to increased fuel pressures in said first mentioned fuel feeding means for feeding fuel to said annular combustion chamber for adding propulsive thrust to the propulsive thrust developed by said primary reactive unit, said secondary reactive unit being open at both ends and said primary reactive unit having a compressed air supply conduit passing through the side of said apparatus and adapted for connection to a support for said apparatus including a source of compressed air.

4. Apparatus for producing a jet reactive propulsive thrust, comprising a primary unit including a combustion chamber, and a secondary reactive unit of expanded cross-section relative to said primary reactive unit and longitudinally enclosing the latter, said primary and secondary reaction units having a common tailpipe, both of said units being of generally streamlined configuration, said secondary reactive unit being open at the leading and trailing ends thereof for the passage of air therethrough and said secondary unit having a fuel inlet forwardly of the combustion chamber of the primary unit, pressure responsive valve means for initiating and cutting off the flow of fuel to said inlet when the fuel pressure for said primary unit respectively exceeds and falls below a predetermined level, and said secondary unit forming a cooling chamber for the primary unit when fuel is not being supplied to the secondary unit.

5. In an aircraft rotatable blade assembly which includes a blade, an apparatus for producing a jet reaction propulsive thrust, said apparatus comprising a primary reaction unit including a combustion chamber, and a secondary reaction unit longitudinally enclosing said primary unit, said units having a common tail pipe and being laterally spaced from each other, said secondary unit being open at its leading and trailing ends for the passage of air therethrough, said secondary unit having a fuel inlet in advance of the combustion chamber of the primary unit, means for feeding fuel to said primary unit, means responsive to increased fuel pressure in said first-mentioned fuel feeding means for delivering fuel into said secondary unit to add propulsive thrust to the thrust delivered by said primary unit, a conduit adapted to be connected with a source of compressed air, and said conduit having a discharge end opening in communication with the forward end of said primary unit to deliver compressed air into said primary unit.

FRANK D. BARCLAY, Jr.

REFERENCES CITED

The following references are of record in the file of this patent:

UNITED STATES PATENTS

| Number | Name | Date |
|---|---|---|
| 1,099,083 | Duc | June 2, 1914 |
| 1,305,340 | Bostedo | June 3, 1919 |
| 1,369,672 | Koenig | Feb. 22, 1921 |
| 1,932,702 | Langdon | Oct. 31, 1933 |
| 2,021,481 | Dornier | Nov. 19, 1935 |
| 2,074,098 | Adams | Mar. 16, 1937 |
| 2,142,601 | Bleecker | Jan. 3, 1939 |
| 2,238,905 | Lysholm | Apr. 22, 1941 |
| 2,280,128 | Price | Apr. 21, 1942 |
| 2,290,921 | Udale | July 28, 1942 |
| 2,330,056 | Howard | Sept. 21, 1943 |
| 2,341,257 | Wünsch | Feb. 8, 1944 |
| 2,356,746 | Boushey | Aug. 29, 1944 |
| 2,396,911 | Anxionnaz et al. | Mar. 19, 1946 |
| 2,397,357 | Kundig | Mar. 26, 1946 |
| 2,409,177 | Allen et al. | Oct. 15, 1946 |
| 2,424,882 | Gluhareff | July 29, 1947 |
| 2,427,845 | Forsyth | Sept. 23, 1947 |
| 2,433,107 | Forsyth | Dec. 23, 1947 |
| 2,438,151 | Davis | Mar. 23, 1948 |
| 2,454,040 | Dalton | Nov. 16, 1948 |
| 2,457,936 | Stalker | Jan. 4, 1949 |
| 2,474,359 | Isacco | June 28, 1949 |
| 2,485,502 | McCollum | Oct. 18, 1949 |
| 2,486,990 | Sharpe | Nov. 1, 1949 |
| 2,509,890 | Stalker | May 30, 1950 |

FOREIGN PATENTS

| Number | Country | Date |
|---|---|---|
| 227,151 | Great Britain | Jan. 12, 1925 |
| 366,450 | Great Britain | of 1930 |
| 454,266 | Great Britain | Sept. 28, 1936 |
| 557,011 | Great Britain | Nov. 1, 1943 |
| 423,590 | France | Feb. 20, 1911 |
| 648,107 | France | Aug. 7, 1928 |
| 612,362 | Germany | Apr. 18, 1935 |